United States Patent
Futai et al.

(10) Patent No.: US 6,180,421 B1
(45) Date of Patent: Jan. 30, 2001

(54) METHOD AND APPARATUS FOR MANUFACTURING MAGNETIC HEAD

(75) Inventors: Hideaki Futai; Kazumasa Hosono; Mitsumasa Okada, all of Nagano; Yoshinori Ohtsuka, Atsugi, all of (JP)

(73) Assignee: Fujitsu Limited, Kawasaki (JP)

(*) Notice: Under 35 U.S.C. 154(b), the term of this patent shall be extended for 0 days.

(21) Appl. No.: 09/507,555

(22) Filed: Feb. 18, 2000

(30) Foreign Application Priority Data

Jul. 30, 1999 (JP) .................................................. 11-217229

(51) Int. Cl.[7] ..................................................... H01L 21/00
(52) U.S. Cl. .................................................... 438/3; 216/66
(58) Field of Search ................................... 438/3; 216/66

(56) References Cited

U.S. PATENT DOCUMENTS 5,438,747 * 8/1995 Krounbi et al. ......................... 29/603
5,805,391 * 9/1998 Chang et al. ......................... 360/113

OTHER PUBLICATIONS

El–Kareh, Fundamentals of Semiconductor Processing, Boston: Kluwer Academic Publishers, pp. 288–290, 1995.*

* cited by examiner

Primary Examiner—Charles Bowers
Assistant Examiner—Erik Kielin
(74) Attorney, Agent, or Firm—Greer, Burns & Crain, Ltd.

(57) ABSTRACT

A magnetic head manufacturing method including the steps of forming a recording lower magnetic pole and a recording upper magnetic pole on a substrate and trimming, by the ion milling method, a portion of the recording upper magnetic pole and the recording lower magnetic pole under the condition that the substrate is stationary.

11 Claims, 20 Drawing Sheets

|  | TRIMMING TIME | REDUCTION IN THE AMOUNT OF POLE LENGTH |
|---|---|---|
| TRIMMING WITH ROTATION (REFERENCE HEI 10-184780) | About 50 min/wf | 1.3 μm |
| TRIMMING TIME WITHOUT ROTATION (PRESENT INVENTION) | About 20 min/wf | 0.8 μm |
| COMPARISON | Shortened by 30 min | Controlled by 0.5 μm |

|  | TRIMMING TIME | REDUCTION IN THE AMOUNT OF POLE LENGTH |
| --- | --- | --- |
| TRIMMING WITH ROTATION (REFERENCE HEI 10-184780 | About 50 min/wf | 1.3 μm |
| TRIMMING TIME WITHOUT ROTATION (PRESENT INVENTION) | About 20 min/wf | 0.8 μm |
| COMPARISON | Shortened by 30 min | Controlled by 0.5 μm |

FIG.19

METHOD AND APPARATUS FOR MANUFACTURING MAGNETIC HEAD

The present invention relates to a method of manufacturing a magnetic head for recording or reproducing information to or from a magnetic recording medium of magnetic disk apparatus or magnetic tape apparatus, and more particularly, to a head having a narrow core width for higher magnetic field intensity.

BACKGROUND OF THE INVENTION

With the realization of high recording density of a magnetic recording medium, high performance of magnetic heads is now required. In order to realize high recording density, the line recording density and track density of a magnetic recording medium must be improved, which means a magnetic head should assure high frequency recording and less recording blur. Here, a "recording blur" means the phenomenon of the recording magnetic field spreading in the track width direction at the time of data writing enough to influence adjacent tracks.

Particular attention is now focused on magneto-resistive ("MR") heads that can be used for a small size disk apparatus while assuring high output which does not depend on the velocity of the magnetic recording medium. This MR head satisfies the requirement for high recording density. As a magnetic head having a MR head, a specific magnetic head called a composite type head is well known. This composite type head is formed by stacking in the laminating direction. It has a reproducing head of multilayer structure to read magnetic information from a magnetic recording medium and a recording head of multilayer structure to write information to the magnetic recording medium.

There is a member at the boundary of the reproducing head and the recording head. In particular, a magnetic shield layer (upper magnetic shield layer) in the side of the reproducing head is also used as the lower magnetic pole in the side of the recording head among a pair of magnetic poles of the recording head. Therefore, the surface (ABS or floating surface) of the lower magnetic pole, which is part of the recording head opposite to the magnetic recording medium, is formed wider than the width of the recording tracks of the magnetic recording medium. As a result, in the writing operation, the recording magnetic field is generated from the lower magnetic pole, which spreads widely in the track direction of the recording medium. However, it becomes difficult to narrow the track width and reduce the track pitch, both being requirements for high recording density. Both upper and lower magnetic poles of the recording head are connected at the center area of an eddy type recording coil, and a recording magnetic field is generated over the Air Bearing Surface ("ABS") between the lower magnetic pole and the upper magnetic pole. In order to improve the recording density, it is required to set the core width of the ABS of the upper magnetic pole to a small size (1 μm or less) to reduce the recording blur. However, there are some barriers for realizing fine width of the core.

As illustrated in FIG. 1, since a recording coil 112 is embedded in an interlayer insulating layer 111 formed between the upper and lower magnetic poles, a large difference of levels exists at the surface of the interlayer insulating layer 111. Therefore, liquid resist 115, coated on the interlayer insulating layer 111, used in the process of forming the upper magnetic pole, flows toward the lower level area. As a result, the resist 115 becomes thin at the higher level area (flat area) but becomes comparatively thick at the lower level area (bottom area).

In the process of forming the upper magnetic pole, resist 115 is first formed at the surface of interlayer insulating layer 111 and is then patterned to the predetermined shape. The upper magnetic pole is formed by plating on the area of the interlayer insulating layer 111 from which the resist 115 is removed. In order to form the upper magnetic pole in the predetermined thickness, the thickness of the resist on the flat area is required to be about 6 μm. However, due to the existence of level (or thickness) differences of the interlayer insulating layer, the thickness of the resist on the bottom area becomes about 10 μm. Here, it is very difficult to realize a target core width of 10 μm or less for the ABS of the upper magnetic pole when the resist is formed in the thickness of 10 μm or more.

In order to solve this problem, the applicant of the present invention has proposed, in Japanese Published Unexamined Patent Application No. HEI 9-109845 (Apr. 25, 1997), a partial trimming technique for the upper magnetic pole using a focused ion beam (FIB). In particular, it has been proposed that the upper magnetic pole be locally trimmed by the FIB method from the ABS surface side in order to narrow the core width during composite type magnetic head manufacturing process.

FIGS. 2(a) and 2(b) show a process of trimming the upper magnetic pole using the focused ion beam method. As shown in FIG. 2(a), the upper magnetic pole 116 covers a part of an eddy type recording coil 112. Moreover, the upper magnetic pole 116 includes a pole 116a which is elongated in the area adjacent to the recording medium.

FIG. 2(b) is a view showing the trimming process using the focused ion beam method for the pole 116a. In the trimming process, the lower magnetic pole located at both side portions and the lower area of the pole 116a (the area in contact with the gap layer of the upper magnetic pole 116) is trimmed by irradiation of the focused ion beam. With this trimming process, the width of the pole 116a of the upper magnetic pole 116 is shaped to the desired size, and a groove (trench) or recess is formed in the upper layer of the lower magnetic pole located at both lower areas of the pole.

As explained above, the width of the pole 116a can be finished in the fine dimension using the focused ion beam method. Spread in the track width direction of the recording magnetic field generated between the upper and lower magnetic poles can be minimized using the upper magnetic pole 116 having the pole of fine width. As a result, the writing of data in higher track density can be realized on the magnetic recording medium.

However, trimming of the upper magnetic pole using the focused ion beam will deteriorate productivity. In the focused ion beam method, the ion beam is focused to predetermined positions in both sides of the pole to set the ion irradiation area in every head element to trim the width of the pole to 1 μm or less. Because a plurality of head elements are formed on a wafer substrate, longer time is required since the process must be repeated for each head element. For example, even if the processing time of one head element is about 10 seconds, it will take over a day (27.7 hours) for processing only a sheet of wafer because there are about 10,000 heads in a 5-inch wafer, which is still comparatively small in size. It is simply not practical to use focused ion beam equipment for actual production.

The applicant of the present invention has proposed to replace the use of the focused ion beam method disclosed in Japanese Published Unexamined Patent Application No. HEI 10-184780 (Jun. 25, 1998) for trimming the upper magnetic pole with the ion milling method.

FIGS. 3(a) and 3(b) illustrate the trimming of the upper magnetic pole using the ion milling method. FIG. 3(a) is a plan view of the upper magnetic pole, and FIG. 3(b) is a cross-sectional view along the line B—B of FIG. 3(a).

First, as illustrated in FIG. 3(a), resist 26 is coated to the area, except for the object area of trimming when the upper magnetic pole 116 is formed. In practice, the pole 116a of the upper magnetic pole and the area, except for the lower magnetic pole 114 located at the lower area of the pole, are covered with resist. The trimming is performed by radiating the side surface of an elongated pole of the upper magnetic pole and the upper layer of the lower magnetic pole with the ion beam as shown in FIG. 3(b) as the substrate is rotated. In the initial stage of trimming, the incident angle of the ion beam to the side surface of the pole is ranged from 10° to 40°, and the upper layer of the lower magnetic pole 114 is mainly trimmed. After the upper layer of the lower magnetic pole 114 is trimmed up to the predetermined depth, the trimming is executed to the side surface of the pole 116a at an incident angle of the ion beam $\theta$ being set to 50° to 80°.

Trimming by this ion milling method makes it possible to shape many head elements formed on the wafer at one time, and therefore the trimming time is reduced to a large extent in comparison to the focused ion beam method.

In Japanese Published Unexamined Patent Application No. HEI 10-184780, the ion beam is irradiated under the condition that the substrate is rotated about an axis and is irradiated at an angle with respect to the axis. Therefore, the head elements formed on the wafer receive the ion beam in various directions. During the period of the ion beam irradiating from the pole side of the upper magnetic pole, the trimming is performed effectively. However, while the period of the ion beam irradiating from the flat area side of the upper magnetic pole, the ion beam is shielded by the flat area of the upper magnetic pole in the higher stacking height. Thus, the target area of trimming is not hit by the ion beam, specifically the upper layer area of the lower magnetic pole. A longer time is then required to finish the head element to the predetermined shape even when using the technique disclosed in Japanese Published Unexamined Patent Application No. HEI 10-184780.

Moreover, in trimming by the ion milling method, the ion beam is radiated not only to the side surface of the pole but also to the upper surface thereof. Since the upper surface of the pole is located at a comparatively high position, it is always irradiated with the ion beam without relation to the irradiating direction of ion beam. Therefore, when the trimming time becomes longer, the reduction in height of pole (pole length) is also increased.

Since the pole length influences the intensity of the magnetic field generated by the recording head, the shorter the pole length becomes the weaker the intensity of the magnetic field becomes. In the recording operation to the recording medium, an adequate intensity of magnetic field to be given to the recording medium is two times the reactive magnetic force of the medium. Since the reactive magnetic force of the recent recording medium is about 2500 (Oe), the magnetic field intensity of about 5000 (Oe) is required. To satisfy this requirement, reduction in pole length due to the ion milling method must be minimized.

OBJECT OF THE INVENTION

Therefore, it is an object of the present invention to provide a magnetic head manufacturing method which is suitable for high recording density.

Another object of the present invention is to provide a method to manufacture a magnetic head having narrow core width.

A further object of the present invention is to provide a method of manufacturing a magnetic head having higher magnetic field intensity.

Yet another object of the present invention is to provide a method of manufacturing a magnetic head which can reduce the adjusting time of core width.

SUMMARY OF THE INVENTION

In the magnetic head manufacturing method of the present invention, the core width of the elongated pole of the upper magnetic pole is adjusted by using the ion milling method in the condition such that the substrate is not rotated. Specifically, the ion beam irradiating direction is fixed by performing the trimming such that the substrate is not rotated, and thereby the ion beam can be applied only to the targeted trimming object. As a result, the trimming time is then shortened, and reduction of pole length can also be controlled. It follows that the magnetic field intensity generated by the magnetic head is enhanced. Moreover, the trimming process is conducted by setting a plurality of combinations of the rotating angle of substrate and tilting angle. Thereby, the ion beam irradiating direction can be changed depending on the trimming object portion and the trimming time can be further reduced.

Here, the trimming to the upper layer of the lower magnetic pole and the side surface of the elongated pole of the upper magnetic pole can be performed effectively by changing the tilting angle in two steps. For example, when the upper layer of the lower magnetic pole is considered as the target, the ion beam is preferably incident in the angle of 10° to 40° to the rotating shaft. When the side surface of the elongated pole of the upper magnetic pole is considered as the target, the ion beam is preferably incident in the angle of 50° to 80° to the rotating shaft. Since the tilting angle of the substrate is set to the above angles, the ion beam can be applied effectively to the trimming object. Thus, reduction of the thickness of the area outside the trimming object, such as the pole length can be controlled.

The trimming can also be conducted to the right side area and left side area of the head element by changing the rotating angle in two steps. For example, when the right side viewed from the ABS surface is set as the target, the ion beam is incident in the counterclockwise angle of 20° to 90° from normal to the ABS. However, when the left side is set as the target, the ion beam is incident in the clockwise angle of 20° to 90° from normal to the ABS. Furthermore, recording blur can be eased by making the core width of the recording gap layer equal to the core width of the upper layer of the lower magnetic pole in order to realize high recording density.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 5(a)' is an enlarged view of the section enclosed by the dashed line in FIG. 5(a);

FIG. 19 is a table showing the effect of the present invention.

DETAILED DESCRIPTION OF THE INVENTION

Figure 1:
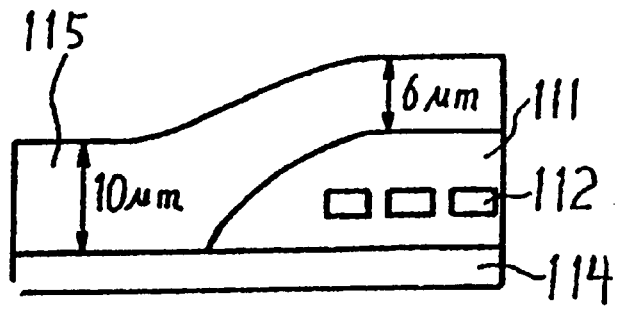
FIG. 1 is a diagram illustrating the problem with manufacturing thin film magnetic head in prior art.
Figure 2A:
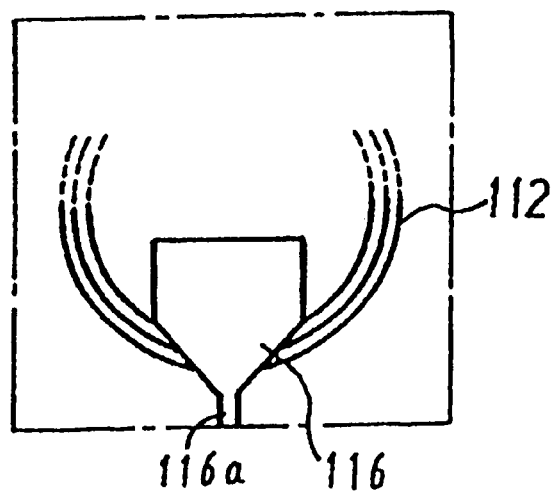
FIG. 2(a) is a diagram illustrating a trimmed portion of an upper magnetic pole.
Figure 2B:
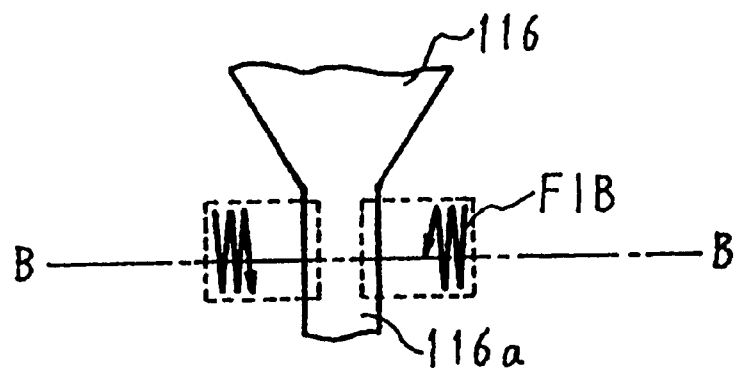
FIG. 2(b) is a diagram illustrating the trimming process using the focused ion beam method.
Figure 3A:
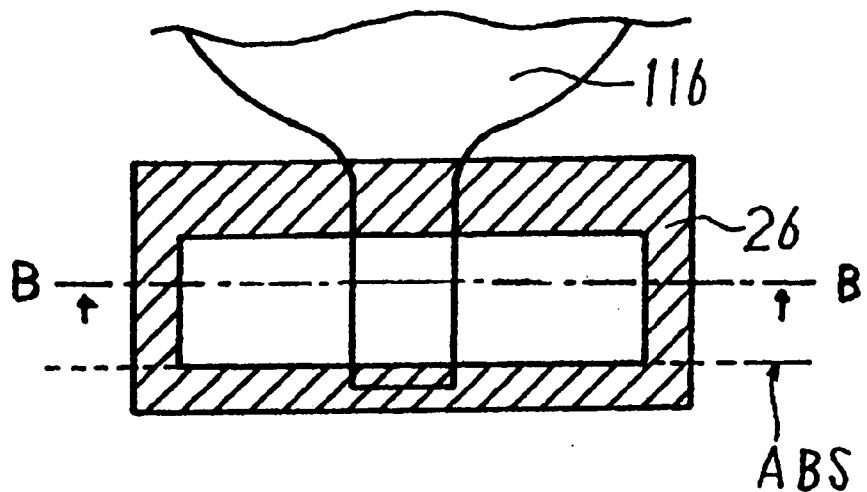
FIGS. 3(a) and 3(b) are views illustrating the upper magnetic pole and the lower magnetic pole in the conventional trimming operation.
Figure 3B:
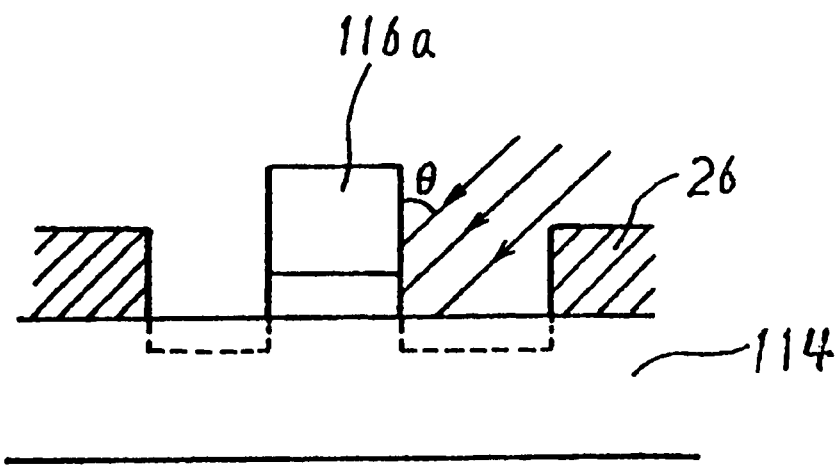
Figure 4:
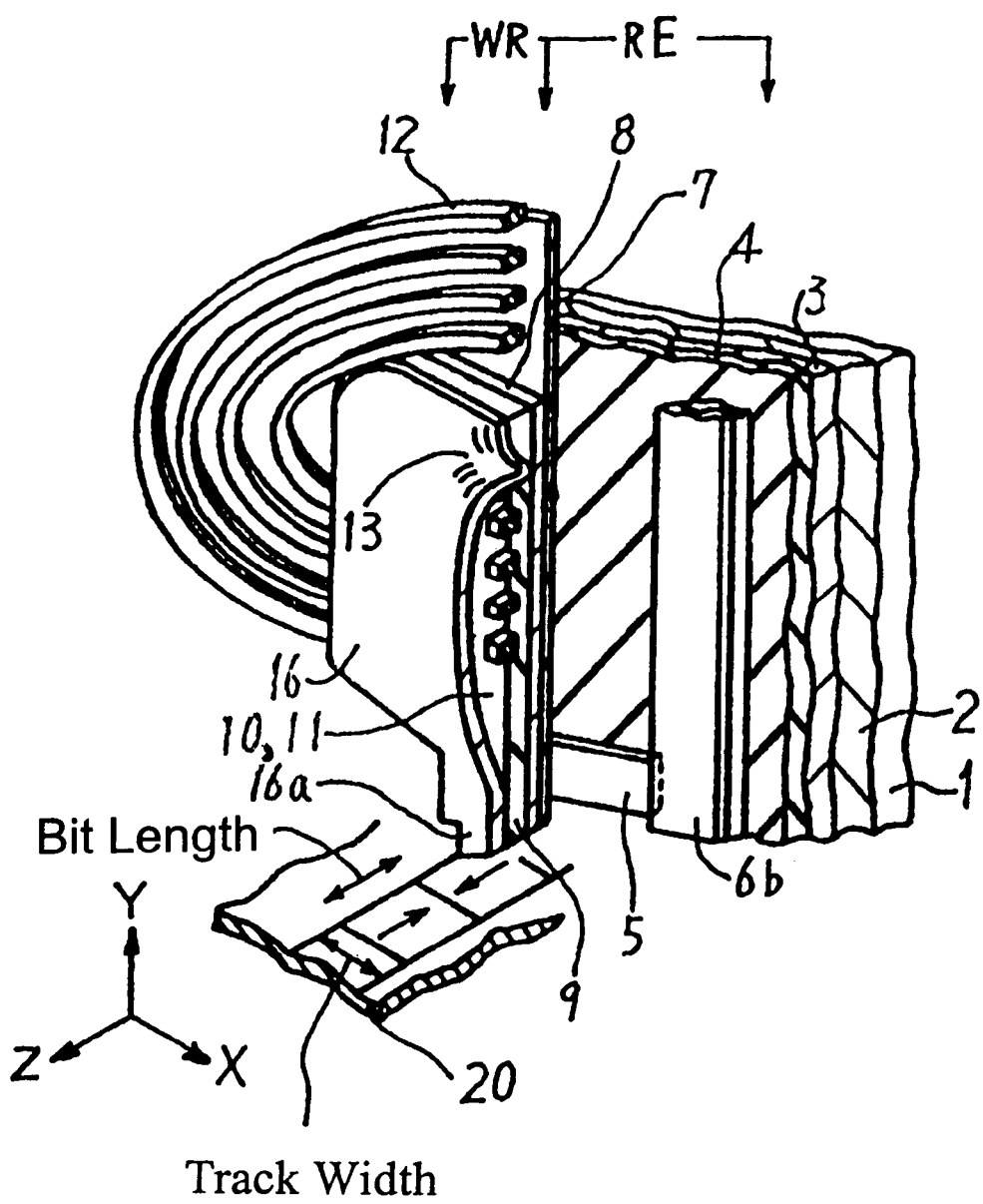
FIG. 4 is an exploded view of the preferred embodiment of the composite magnetic head.

FIG. 4 is an exploded view of the preferred embodiment of the composite type magnetic head. In FIG. 4, a protection layer at the upper most layer is omitted in order to show the internal side of the magnetic head. Furthermore, half of the recording head is also omitted for clarity. The composite type magnetic head is provided with a substrate 1, a substrate protection film 2 formed on the substrate, a reproducing head RE formed on this substrate protection film, a recording head WR formed on this reproducing head and a protection layer 17 (not shown)formed on this recording head.

The reproducing head RE includes a lower side magnetic shield layer 3, the first non-magnetic insulating layer (reproducing lower side gap layer) 4 formed on this lower side magnetic shield layer 3, a magnetic transducer 5 formed on the reproducing lower side gap layer 4, a pair of terminals 6a, 6b (only one is shown) formed on both ends of the magnetic transducer 5, a second non-magnetic insulating layer (reproducing upper side gap layer) 7 formed on a pair of terminals 6a, 6b and an upper side magnetic shield layer 8 formed on the reproducing upper side gap layer 7. Namely, the reproducing head RE covers both surfaces in the Z direction of the magnetic transducer 5 and terminals 6a, 6b (FIG. 5(a)') with the upper and lower gap layers 4, 7. In addition, the upper and lower gap layers 4,7 are covered by a lower side magnetic shield layer 3 and an upper side magnetic shield layer 8.

The upper side magnetic shield layer 8 is a merge type layer working also as the lower magnetic pole of the recording head WR which will be explained later. Therefore, in the specification, the upper side magnetic shield/recording lower magnetic pole 8 is expressed as the upper side magnetic shield layer 8 or lower magnetic pole 8.

The recording head WR includes a lower magnetic pole 8, a recording gap layer 9, an eddy type recording coil 12 arranged on the recording gap layer 9, third and fourth non-magnetic insulating layers 10, 11 covering the recording coil 12 and an upper magnetic pole 16 formed on the third and fourth non-magnetic insulating layers. Namely, the recording head WR covers both surfaces of the gap layer 9 and the third and fourth non-magnetic insulating layers 10, 11 sandwich the recording coil 12 with the lower magnetic pole 8 and upper magnetic pole 16.

However, the recording coil does not exist at the eddy type center area 13 of the recording coil 12. In this eddy type center area, the upper magnetic pole 16 drops so it is in contact with the lower magnetic pole 8. Moreover, the upper magnetic pole 16 becomes narrower toward the recording medium 20, and this portion is the pole 16a.

As explained above, the composite type magnetic head illustrated in FIG. 4 has a piggy-back structure in that the recording head WR is added to the rear side of the reproducing head RE. In view of making clear the positional relationship of the elements of the magnetic head, as shown in FIG. 4, the direction along the ABS surface of upper magnetic pole 16 is defined as the X direction, the direction vertical to the ABS surface is the Y direction and the stacking direction of the magnetic head is the Z direction. Each element of the composite type magnetic head will be explained.

The substrate 1 is composed of a material such as alumina titanium carbide ($Al_2O_3TiC$), ferrite and calcium titanate, and etc., and it is formed as an almost circular wafer.

The substrate protection layer 2, the first non-magnetic insulating layer 4, the second non-magnetic insulating layer 7 and the recording gap layer 9 are all formed, for example, of $Al_2O_3$. The gap layer 9 has a thickness of about 0.2 to 0.6 μm. The recording magnetic field is generated at the pole 16a of the upper magnetic pole and the ABS surface of the lower magnetic pole 8 located at both sides of the gap layer 9.

The lower magnetic shield layer 3, the upper magnetic shield layer 8 and the upper magnetic pole 16 are composed, for example, of NiFe alloy. This alloy may also be replaced with the Co-based alloy (i.e., CoNiFe and CoZr) and Fe-based alloy (i.e., FeN and FeNZr). The thickness of upper magnetic pole 16 is about several μm.

The magnetic transducer 5 is composed, for example, of anisotropic magneto-resistive effect element(MR element) or typically a gigantic magneto-resistive effect element (GMR element) such as spin bulb magneto-resistive element. At both ends of the magnetic transducer 5, a pair of terminals 6a, 6b are connected. In the data reading operation, a constant current (sense current) flows into the magnetic transducer 6 through these terminals.

The composite type magnetic head reads information recorded from a magnetic recording medium 20 with a reproducing head RE while moving relatively along the longitudinal direction of the track on the recording medium 20 such that it is isolated by a small distance (floating amount) from the recording medium 20 such as a magnetic disk. Moreover, it writes magnetic information to the recording medium 20 with the recording head WR. The surface opposite to the magnetic recording medium 20 of the magnetic head is called the ABS or floating surface.

Figure 5A:
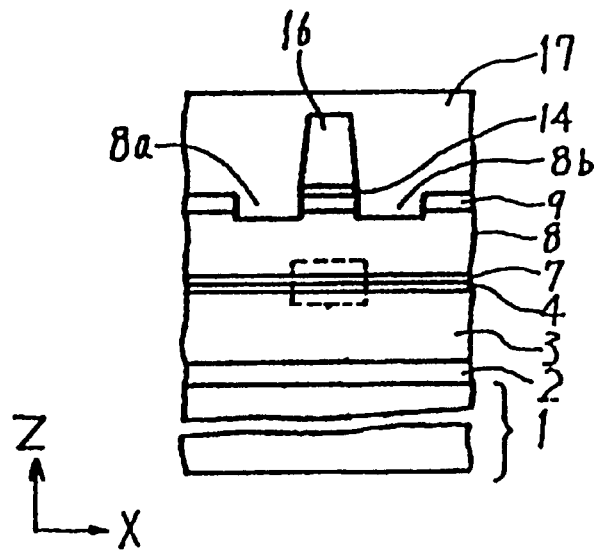
FIG. 5(a) is a cross-sectional view along the x-z plane crossing the top of upper magnetic pole.
Figure 5A:
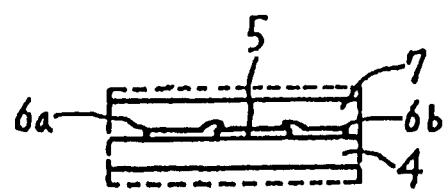
Figure 5B:
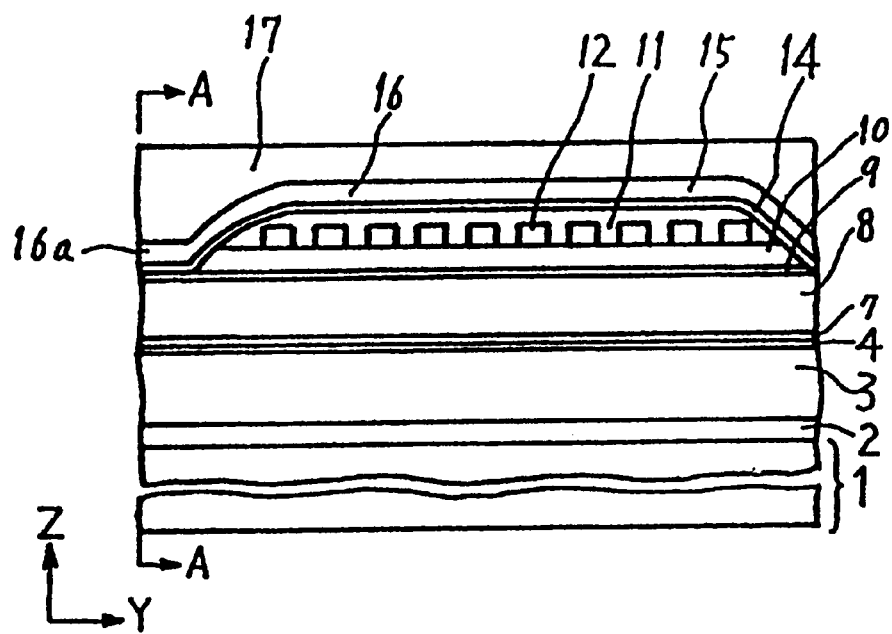
FIG. 5(b) a is cross-sectional view along z-y plane crossing the center of the recording coil.

FIG. 5(a) is a cross-sectional view taken along the X-Z plane crossing the elongated pole, and FIG. 5(b) is a cross-sectional view taken along the plane Y-Z crossing the center of the recording coil. As shown in FIG. 5, the magnetic head comprises, sequentially from the lower side, the substrate 1, the protection layer 2 formed on the substrate 1, the lower side magnetic shield layer 3 formed on the protection layer 2, the first non-magnetic insulating layer 4, the magnetic transducer 5 and the pair of terminals 6a, 6b formed on this first non-magnetic insulating layer 4, the second non-magnetic insulating layer 7 formed on the first non-magnetic insulating layer to cover the magnetic transducer and the pair of terminals, the upper side magnetic shield layer/lower magnetic pole 8 formed on the second non-magnetic insulating layer 7, the recording gap layer 9 formed on this lower magnetic pole 8, the third non-magnetic insulating layer 10 formed on this recording gap layer 9, the eddy recording coil 12 formed on the third non-magnetic insulating layer 10, the fourth nonmagnetic insulating layer 11 covering the recording coil 12, the plating base layer 14 formed on the fourth non-magnetic insulating layer, the upper magnetic pole 16 formed on this plating base layer 14 and the protection layer 17 formed on the upper magnetic pole 16. Here, as illustrated in the partial enlarged view FIG. 5(a)', the magnetic transducer 5 is sandwiched between the first non-magnetic insulating layer 4 and the second non-magnetic insulating layer 7, and both ends of the magnetic transducer 5 are respectively connected to the pair of terminals 6a, 6b. In addition, the upper layer of the lower magnetic pole 8 allows formation of a trench or a pair of recesses 8a, 8b at both sides of the base area of the pole 16a.

The composite type magnetic head manufacturing process illustrated in FIG. 4 will now be explained from the flowchart of FIG. 6, with reference to FIG. 7 and FIG. 8.

Figure 6:
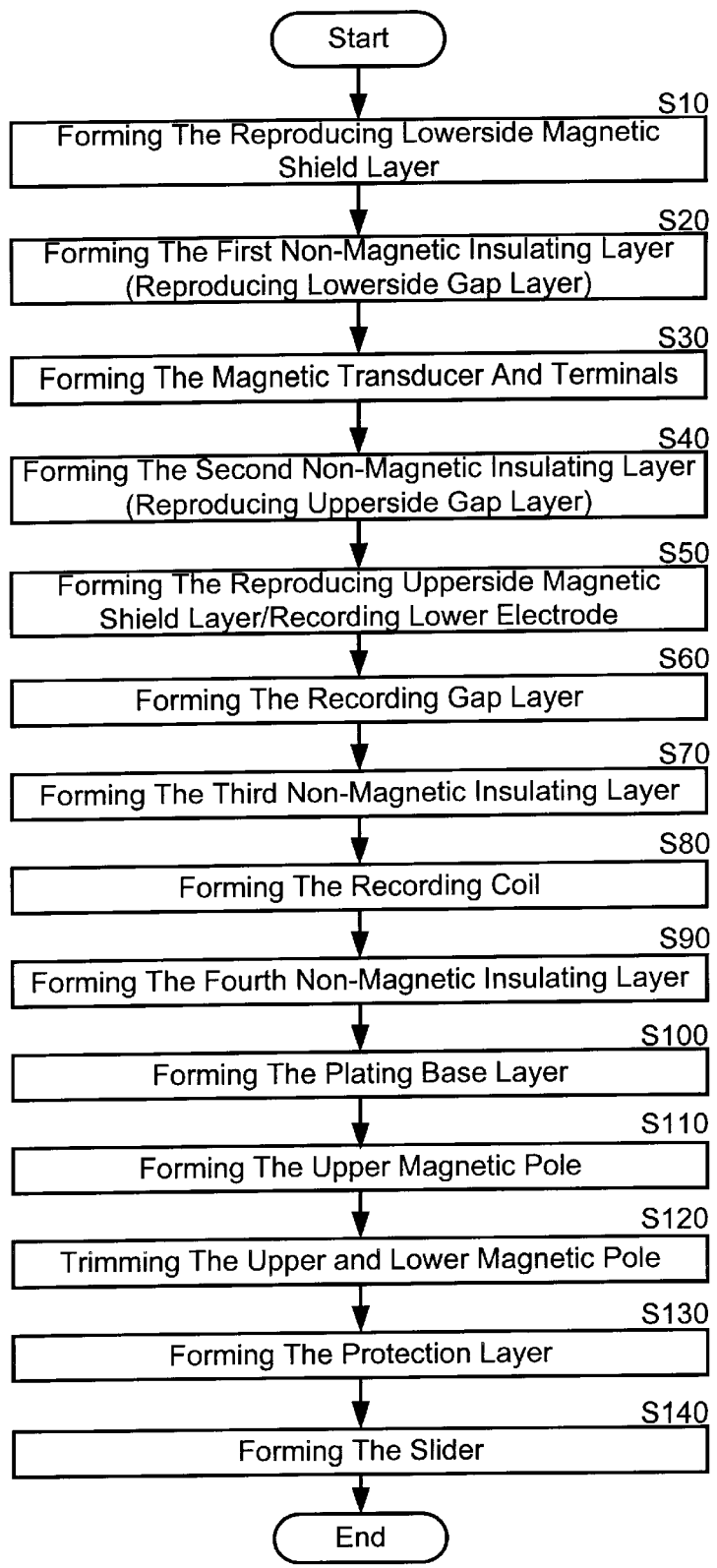
FIG. 6 is a flowchart of the composite type magnetic head manufacturing method shown in FIG. 4.
Figure 7A:
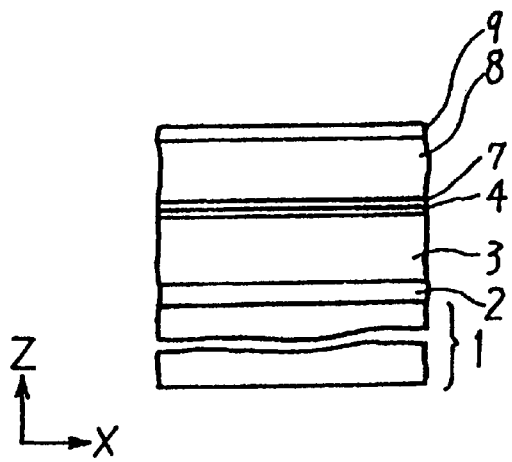
FIGS. 7(a) to 7(f) are cross-sectional views of the magnetic head, taken along the x-z plane crossing the elongated pole in the respective to the steps in FIG. 5.
Figure 8A:
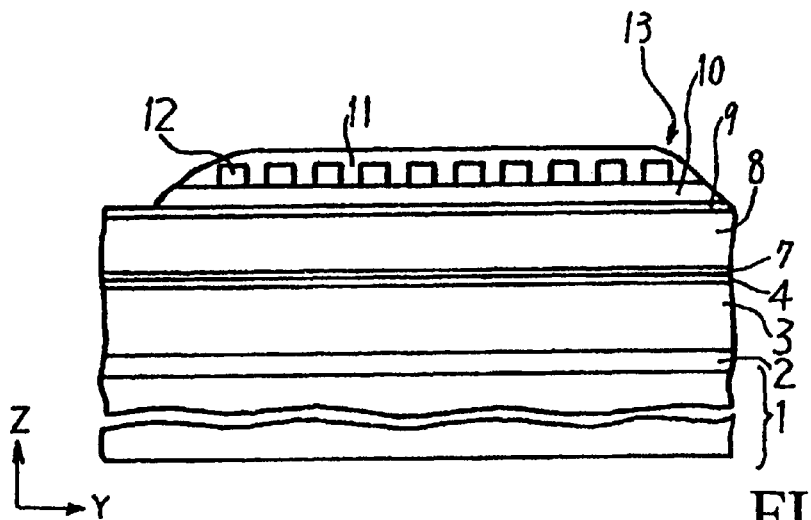
FIGS. 8(a) to 8(f) are cross-sectional views of the magnetic head, taken along the y-z plane crossing the center of the recording coil in respective to steps in FIG. 5.

In step S10 in FIG. 6, the lower side magnetic shield layer 3 is formed. In particular, as illustrated in FIG. 7(a) and FIG. 8(a), the substrate protection film 2 is formed on the substrate 1 and the lower side magnetic shield layer 3 is formed on the substrate protection film 2. For step S20, the first non-magnetic insulating layer (reproducing lower side gap layer) 4 is formed on the lower side magnetic shield layer 3.

The magnetic transducer 5 and the pair of terminals 6a, 6b are formed in step S30, specifically the MR film, GMR film etc. are formed on the first nonmagnetic insulating layer 4 and the magnetic transducer 5 is formed by patterning.

Next, the pair of terminals 6a, 6b are formed respectively at both ends of the magnetic transducer 5.

In step S40, the second non-magnetic insulating layer (upper side gap layer) 7 is formed on the first non-magnetic insulating layer 4 to cover the magnetic transducer 5 and the pair of terminals 6a, 6b. The upper side magnetic shield layer/recording lower side magnetic pole 8 is next formed on the second non-magnetic insulating layer 7, as referred to by step S50. The lower magnetic pole 8 is formed by either the plating method or sputtering method. When the lower magnetic pole 8 is formed by the plating method, a Co-based alloy such as NiFe alloy or CoNiFe is used. After the plating base layer 14 is formed by the sputtering or the vacuum evaporation method, it will increase to a thickness of about several μm larger than that formed by the electrolytic method. In contrast, when the lower side magnetic pole 8 is formed by the sputtering method, the Fe-based alloy (i.e., FeN, and FeNZr) or Co-based alloy (i.e., CoZr) is used as the target. If a film is formed using the sputtering method, the plating base layer is then not required.

Next, step S60 refers to the forming the recording gap layer 9 on the lower side magnetic pole 8. The gap layer 9 may be formed, for example, by $Al_2O_3$, $SiO_2$, etc. However, when a film with a higher etching rate such as $SiO_2$ is used solely as the recording gap layer 9, the thickness of the recording gap layer 9 is sometimes reduced in the later process to form the third non-magnetic insulating layer (thermosetting (hard cure) layer of resist), the recording coil and the fourth nonmagnetic insulating layer (thermosetting (hard cure) layer of resist). In order to avoid such reduction of the film thickness of the recording gap layer 9, a gap protection layer 9a (FIG. 9(b)) can also be provided on the recording gap layer.

Figure 9A:
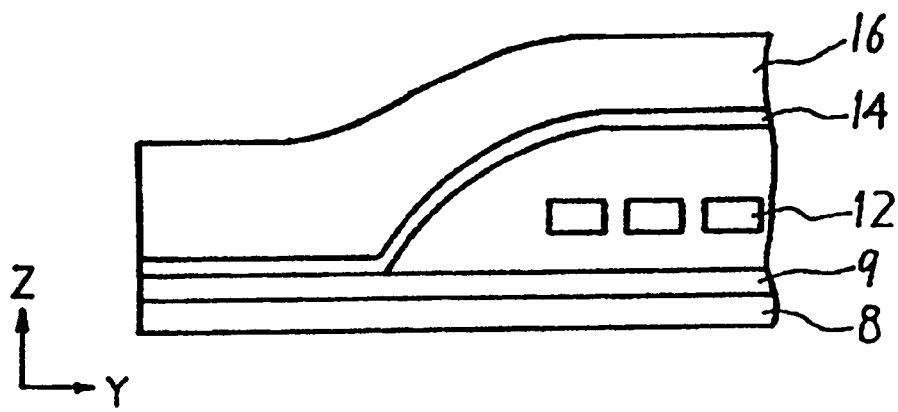
FIG. 9(a) is a view illustrating the magnetic head in which a gap protection layer is not formed on a recording gap layer.
Figure 9B:
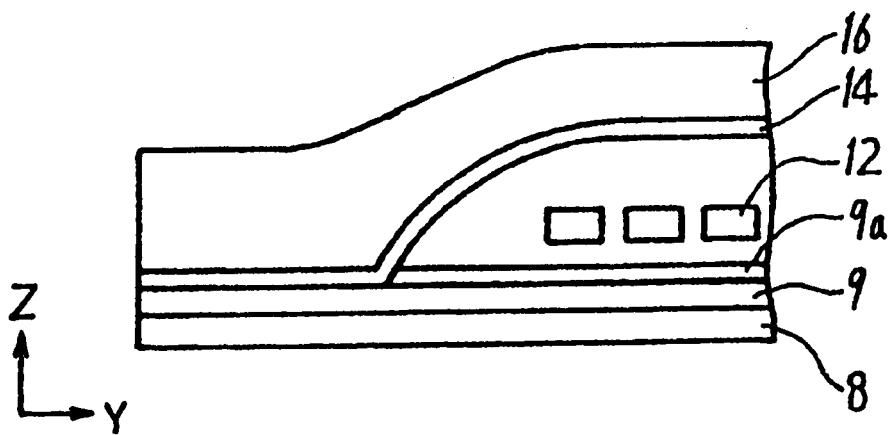
FIG. 9(b) is a view showing the magnetic head without a gap protection layer on a recording gap layer.

FIG. 9(a) shows the magnetic head without the gap protection layer. In contrast, FIG. 9(b) is a view showing the magnetic head with the gap protection layer. As shown in FIG. 9(b), the $SiO_2$ layer is stacked first as the recording gap layer 9 and the gap protection layer 9a such as $Al_2O_3$, SiN, AlN having a comparatively lower etching rate is stacked on the $SiO_2$ film. The gap protection layer 9a is removed before the process of forming the plating base layer (indicated as step S100 in FIG. 6). This gap protection layer 9a is removed by chemical etching.

In step S70, the third non-magnetic insulating layer 10 is formed on the gap layer 9 (or gap protection layer 9a). In this step, the processes are all sequentially performed, for example, the coating of the photosensitive liquid photoresist by the spin coating method, the patterning, the removal of the part corresponding to the center area of the eddy coil 12 and the process of thermosetting (hard cure). The recording coil 12 is next formed in step S80.

In step S90, the fourth non-magnetic insulating layer 11 is formed on the third non-magnetic insulating layer to cover the recording coil 12. FIG. 7(a) and FIG. 8(a) illustrate the shape of the magnetic head in this process. Similar to the formation of the third non-manetic insulating layer, the processes are again performed sequentially, for example, the coating of photosensitive liquid photoresist, the patterning, the removal of the part corresponding to the center area of eddy coil 12 and the thermosetting (hard cure). As explained above, because a hole 13 (FIG. 4) reaching the lower magnetic pole 8 is formed at the center area of eddy coil 12, the hole 13 may be made after the formation of the third and fourth non-magnetic insulating layers.

Figure 7B:
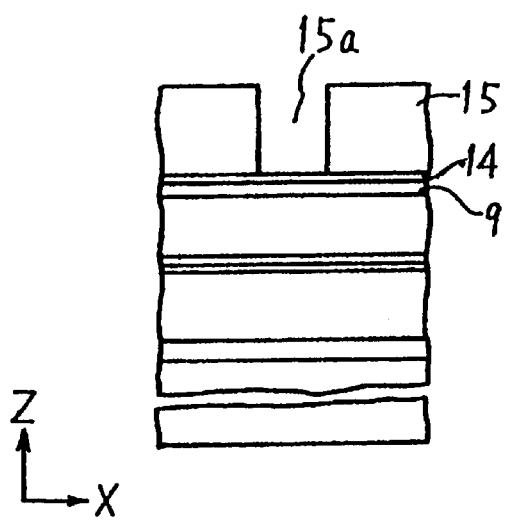
Figure 8B:
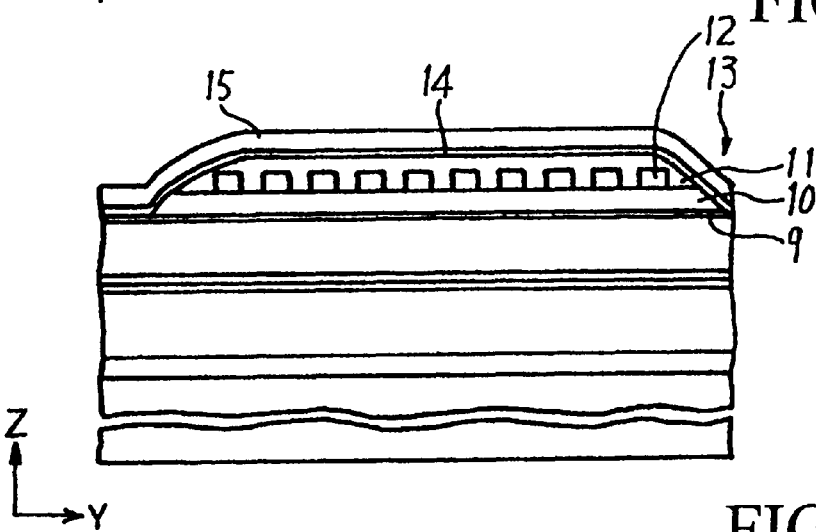

In step S100, also shown in FIG. 7(b) and FIG. 8(b), a plating base layer 14 is formed. Particularly, the plating base layer 14 consisting of NiFe is formed thin, including the internal surface of hole 13 formed on the fourth non-magnetic insulating layer 11 and the gap layer 9 by using the sputtering method, evaporation method, or other similar methods.

Figure 7C:
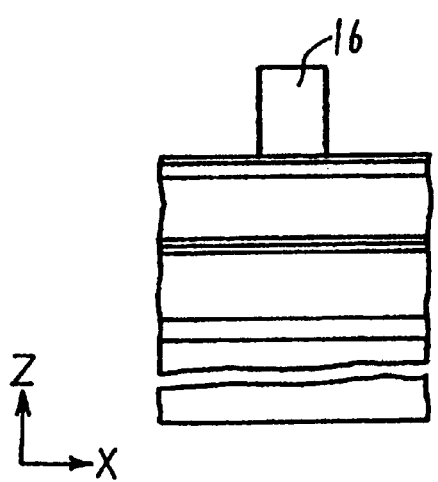
Figure 8C:
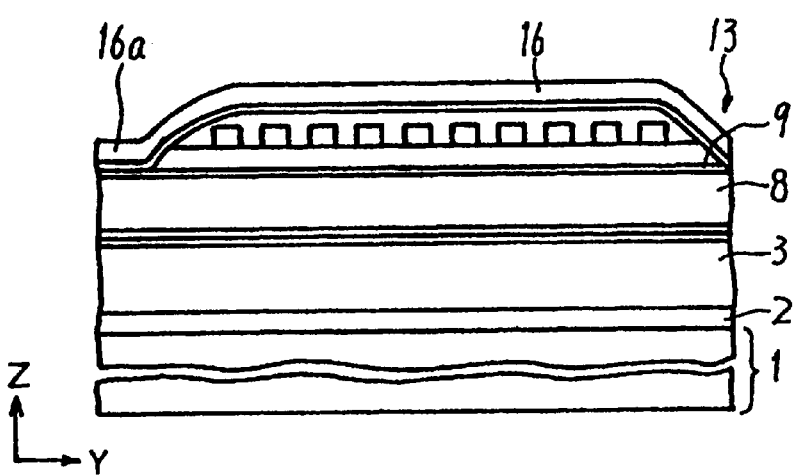

Next, at step S110, the upper magnetic pole 16 is formed. In this step, a window 15a of the photoresist 15 is formed in the area in which the upper magnetic pole should be formed through the coating of photoresist 15 on the plating base layer 14, exposing and developing the photoresist 15. As shown in FIG. 7(c) and FIG. 8(c), the upper magnetic pole 16 consisting of NiFe is next formed in the thickness of several $\mu$m by using the electrolytic plating method within the window 15a. The upper magnetic pole 16 becomes narrower toward the ABS, thus, it becomes the narrow pole 16a in the area opposite to the recording medium. Furthermore, the upper magnetic pole 16 is connected with the lower magnetic pole 8 through the hole 13 located at the center area of the eddy coil 12.

Figure 7D:
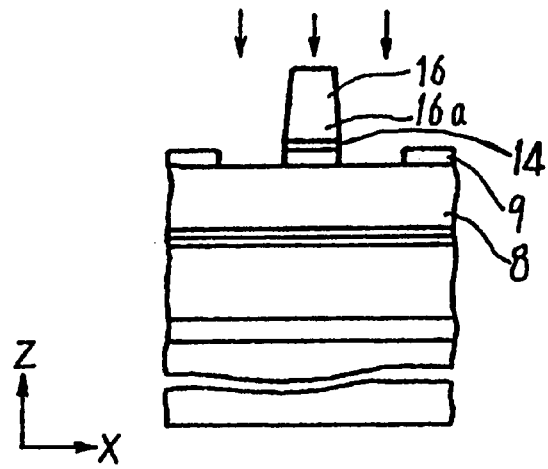
Figure 8D:
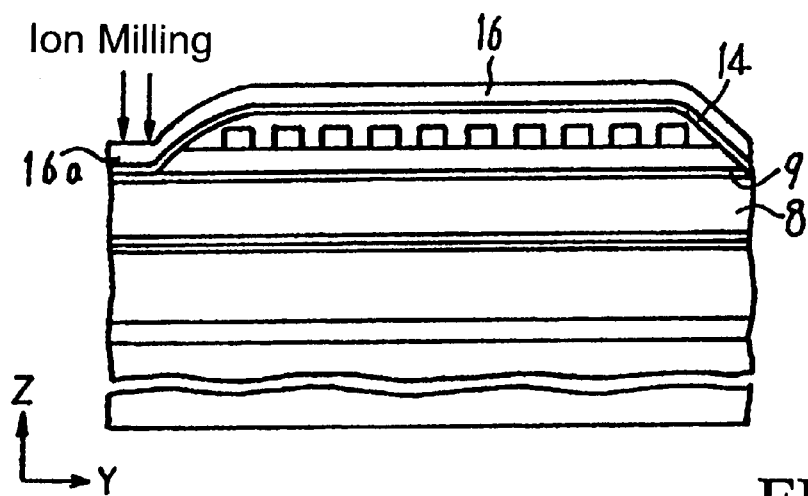

In step S120, the plating base layer 14 is first removed by using the ion milling method as illustrated in FIG. 7(d) and FIG. 8(d). In this case, the upper magnetic pole 16 is also reduced in the thickness corresponding to the plating base layer 14. But since the plating base layer 14 and the upper magnetic pole 16 are formed with the identical material, the upper magnetic pole 16 is reformed substantially to its original thickness after the thickness of the layer 14 is removed.

Figure 7E:
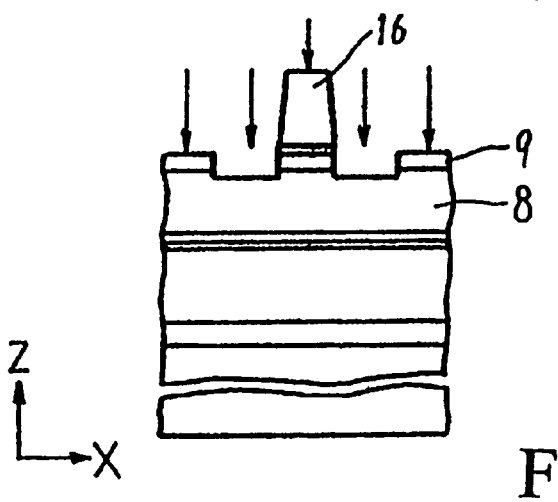
Figure 8E:
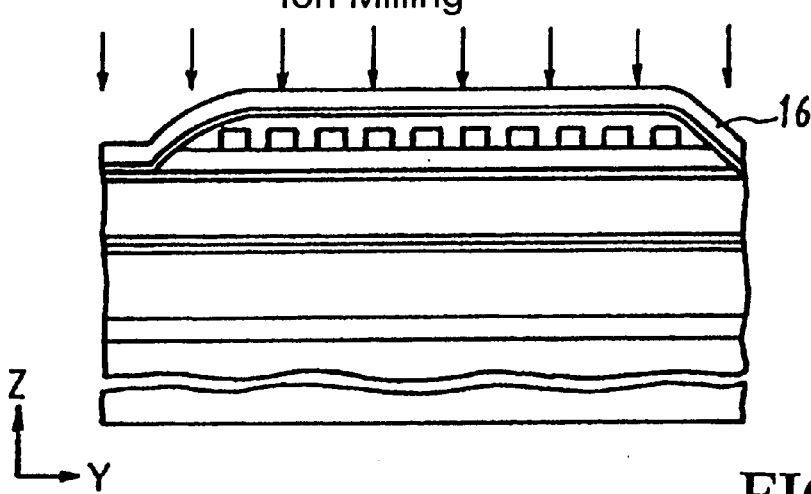

Next, as illustrated in FIG. 7(e) and FIG. 8(e), the pole 16a of the upper magnetic pole 16 and upper layer of the lower magnetic pole 8 are partially milled by using the ion milling method such that the substrate is at a stationary condition and then shaped to the predetermined shape. Before dividing the substrate 1, both sides of the pole 16a are trimmed by the ion milling method, and the pole 16a is narrowed as a result. Simultaneously, the lower magnetic pole 8 located at the lower peripheral area of the pole 16a is partially trimmed and a trench or recess 8a of the predetermined shape is formed in the upper layer of the lower magnetic pole 8. Thereafter, an electrode pad (not illustrated) is connected to the terminals at both ends of the transducer, and the electrode pads (not illustrated) connected to both ends of the recording coil 12 are formed.

This trimming process may be performed at any desired period of time before the formation of the protection film and after the formation of the upper magnetic pole. In regard to the partial trimming process of the pole 16a and the lower magnetic pole 8, the work time can be greatly shortened in comparison to the trimming method under the condition of the substrate rotating. Since the manufacturing time of the magnetic head is shortened, the manufacturing cost is also reduced. The reason is that there is wasted time for irradiating the ion beam from the direction where the trimming effect cannot be attained using the substrate rotating method, whereas the ion milling is conducted only for the trimming object in the method of the present embodiment since the ion beam irradiating direction is fixed.

The predetermined pole shape 16a of the upper magnetic pole 16 and trench or recess 8a in the predetermined shape of the lower magnetic pole 8 will be explained later in detail.

Figure 7F:
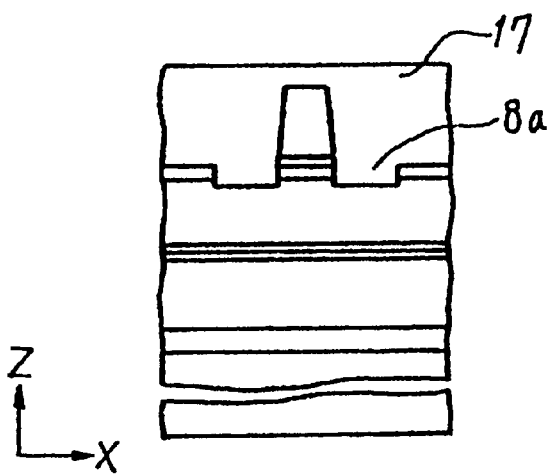
Figure 8F:
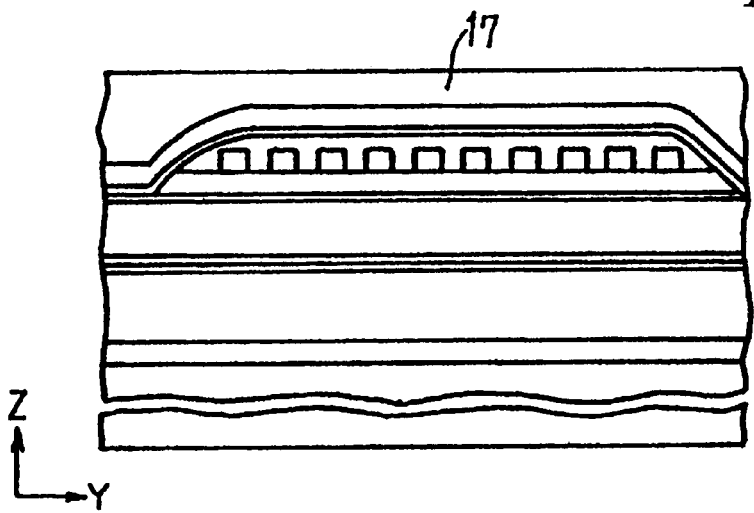

In step S130, also shown in FIG. 7(f) and FIG. 8(f), the protection layer 17 consisting of, for example, $Al_2O_3$ is formed on almost the entire part of the upper magnetic pole 16. The trench 8a of the lower magnetic pole 8 located at both sides of the pole 16a is embedded within the protection layer 17.

Figure 10A:
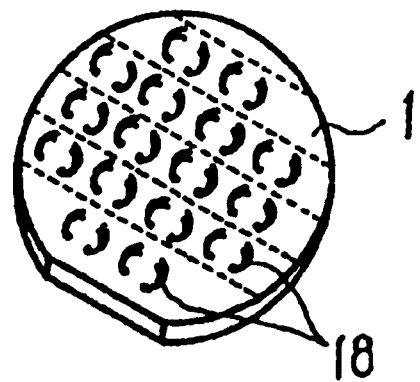
FIG. 10(a) shows a wafer on which a plurality of magnetic heads are formed.
Figure 10B:
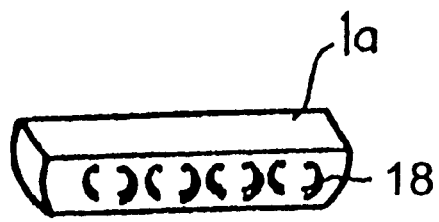
FIG. 10(b) shows a rod-like wafer which is cut from he wafer shown in FIG. 10(a)
Figure 10C:
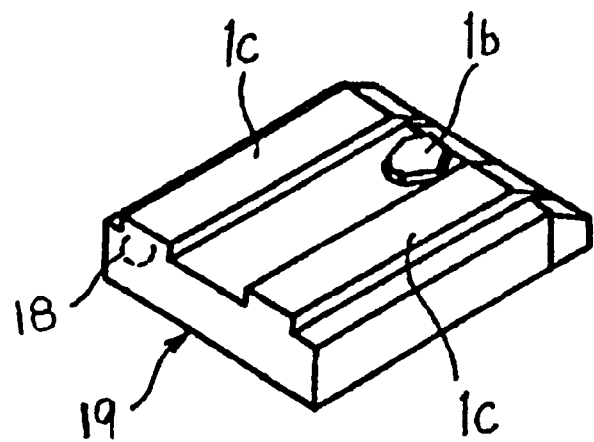
FIG. 10(c) shows a slider manufactured from the rod-type wafer shown in FIG. 10(b)

In step S140, the substrate 1 is divided into a plurality of slider bars. In the processes up until step S130, the composite type magnetic head 18 is formed in multiple numbers (about 11,000 in a 5-inch wafer) in the vertical and horizontal direction on the substrate 1. A part of the wafer edge has a linear shape called orifla (orientation flat area). Because the magnetic heads 18 are arranged along the orifla, the ABS is parallel to the orifla. Furthermore, as shown in FIG. 10(b) the substrate 1 is cut to a plurality of slider bars 1a. FIG. 10(c) shows that the slider bar 1a is provided with the rail surfaces 1b, 1c, and then cut into units of sliders 19.

Figure 11A:
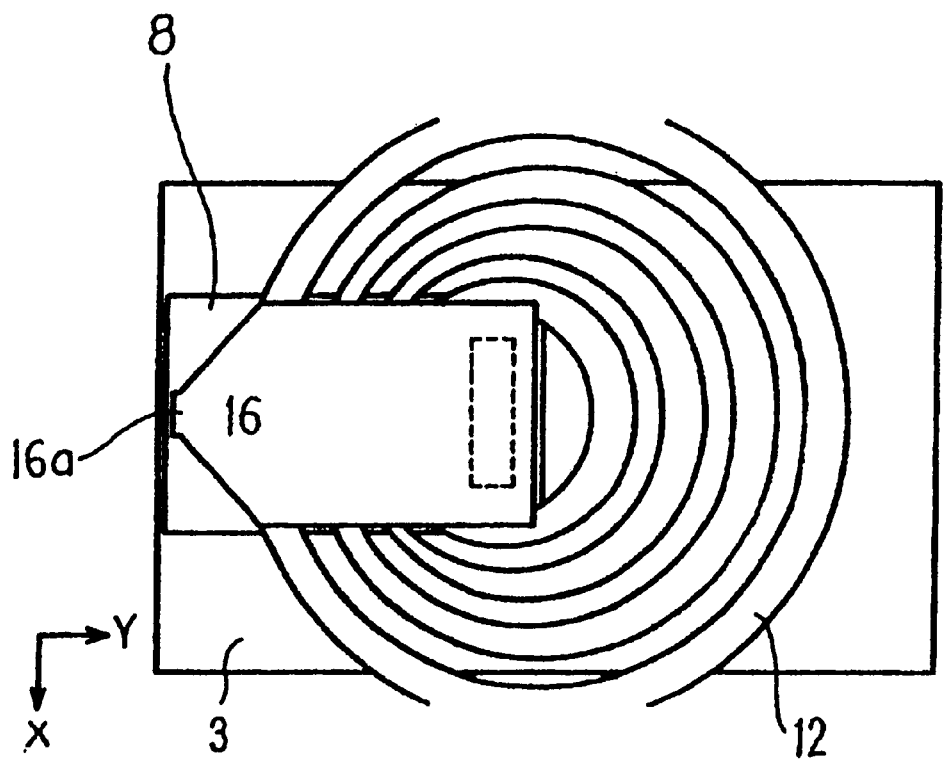
FIG. 11(a) is a plan view of the magnetic head showing an upper magnetic pole and its neighboring members as trimming objects.
Figure 11B:
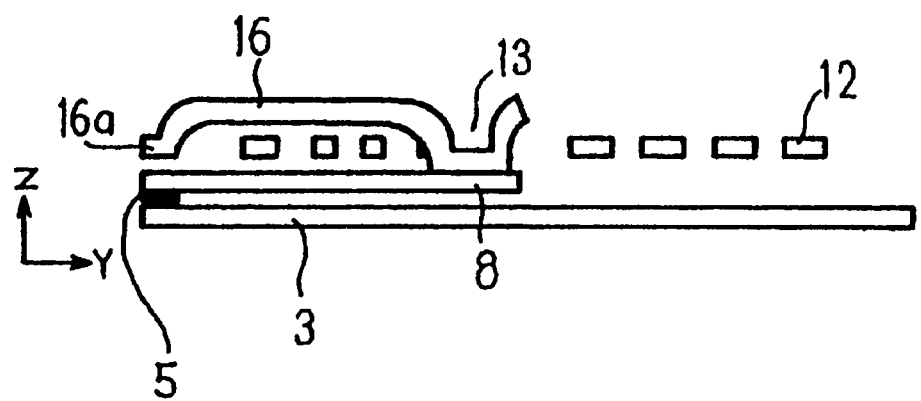
FIG. 11(b) shows a laminated layer sectional structure view of the magnetic head showing the upper magnetic pole and its neighboring members as the trimming objects.

FIG. 11(a) is a plan view of the upper magnetic pole and the lower magnetic pole as trimming objects. FIG. 11(b) shows a laminated layer sectional structure view of the magnetic head showing the upper magnetic pole and its neighboring members as trimming objects. For the trimming objects explained below, the trimming process is performed to the pole 16a and upper layer of lower magnetic pole 8 located at the lower periphery of the pole.

Figure 12A:
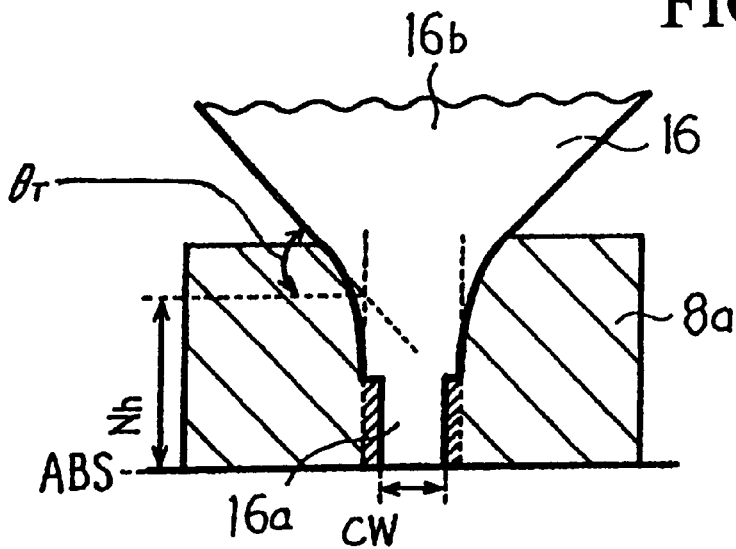
FIGS. 12(a) to 12(c) show the trimmed upper magnetic pole and lower magnetic pole.
Figure 12B:
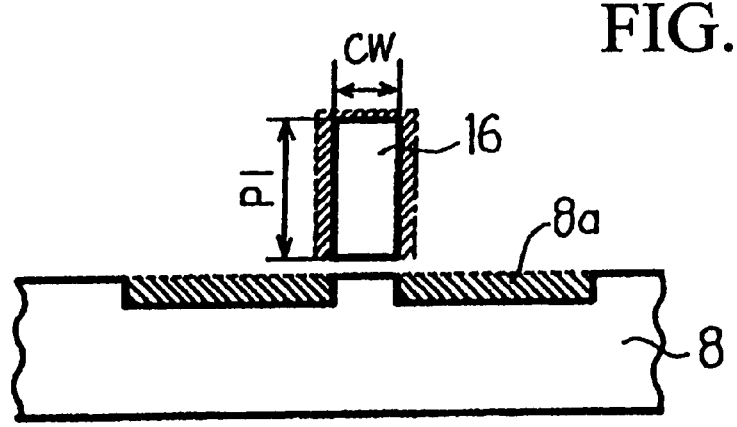
Figure 12C:
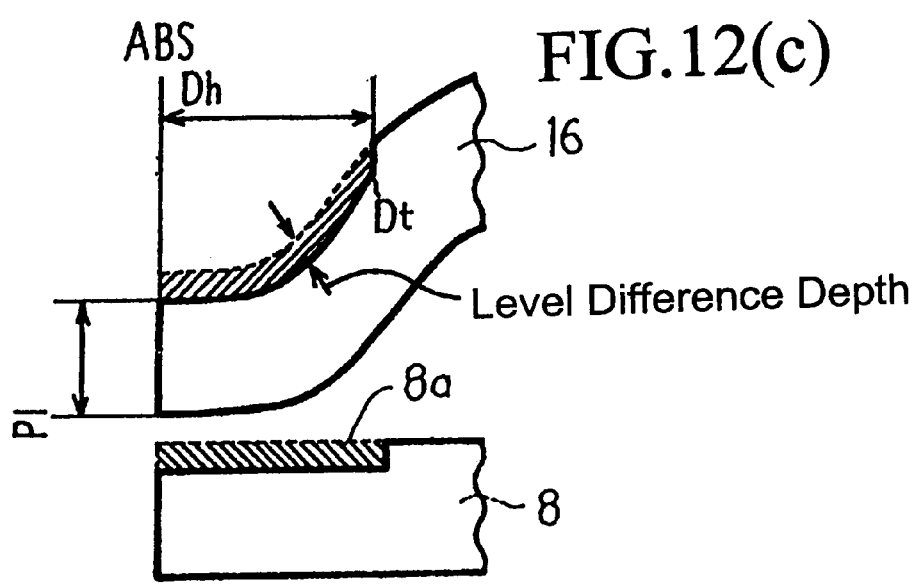

FIGS. 12(a) to 12(c) show the trimmed upper magnetic pole 16 and lower magnetic pole 8. FIG. 12(a) is a plan view of the upper magnetic pole 16 and lower magnetic pole 8. FIG. 12(b) shows the ABS surfaces, and FIG. 12(c) is a side surface view. The densely hatched areas in FIGS. 12(a) to 12(c) indicate the parts deleted by the trimming process using the ion milling method.

As illustrated in FIG. 12(a), the upper magnetic pole 16 is formed as a narrow rod shape (pole 16a) with a constant width up to the area of several $\mu$m from the ABS, and an end part formed as the sector shape 16b. In order to identify the shape of the upper magnetic pole 16 after the trimming process, the width size of the pole in the X axis direction is called the core width "Cw", the length size in the film thickness direction is pole length Pl, the length from the position generating level difference of upper magnetic pole 16 (namely, size in the Y direction for the trimming process) up to ABS is "level difference height Dh", the depth of level difference measured in the upper magnetic pole thickness is "film thickness level difference Dt" and the length from the ABS up to the upper part of the sector shape 16b is the "neck length (Nh)", shown in FIG. 12(a) to FIG. 12(c). The angle θr, measures the relationship between the edge of the sector pole 16a and the edge of the sector shape 16b.

In the preferred embodiment, the width Cw is set to 1 $\mu$m or less and reduction by trimming is set to 1 $\mu$m or less in order to set the pole length Pl to 3 $\mu$m or more.

The level difference depth Dt influences the X axis element Hx of the magnetic field intensity. As Dt becomes large, Hx tends to also become large. The larger Hx is, the lower the manufacturing tolerance is set as the design specification. The value of Dt should be 0.25 or more, preferably 1 $\mu$m or more.

The level difference height Dh also influences Hx. When Dh becomes shorter, Hx has a tendency to become larger. The level difference height Dh should be 5 $\mu$m or preferably 3 $\mu$m or less.

Next, the neck length Nh influences the Hx depending on pole length Pl. In order to alleviate the influence of neck length Nh on Hx, Nh should be 3.0 $\mu$m, preferably 2.5 $\mu$m or less.

Figure 13A:
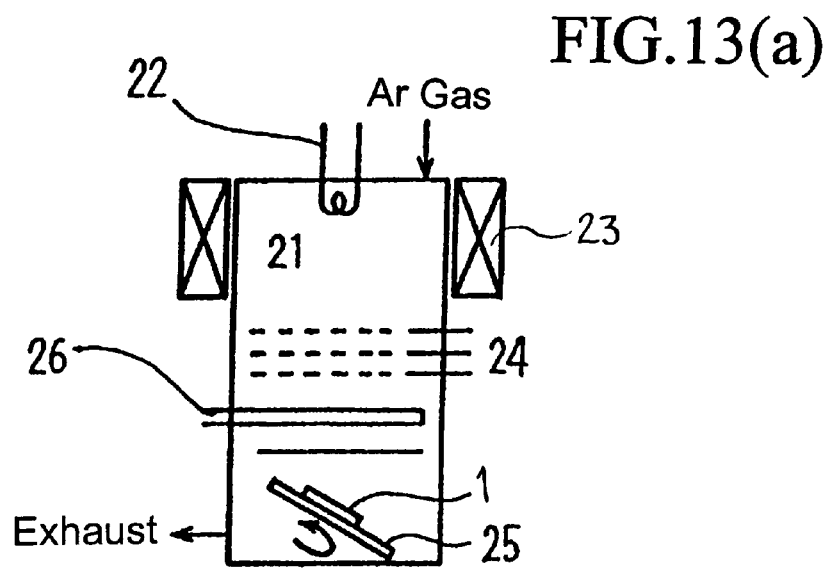
FIG. 13(a) shows an ion milling apparatus.

FIG. 13(a) illustrates an ion milling (ion etching) apparatus. Paralleling the principle of the ion milling method, the etching is performed through physical reaction by utilizing the ion beam. In particular, a heavy inactive gas such as Ar is introduced to a plasma chamber 21, which is ionized while being heated by a filament 22. Simultaneously, an AC magnetic field is applied thereto with a magnet 23. The ionized Ar particle is accelerated by the electric field formed by the grid 24 toward a sample (substrate) on a sample board 25. The accelerated ionized Ar particle is neutralized when it passes through a neutralizing filament 26. The neutralized Ar particle collides with the upper magnetic pole, and the lower magnetic pole of the magnetic head, which are not covered with resist. The area to which the Ar beam collides is physically etched.

Figure 13B:
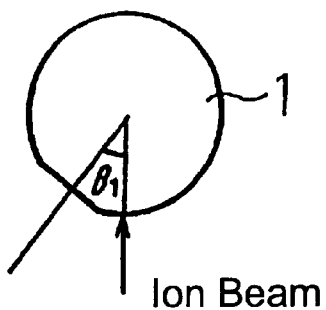
FIG. 13(b) shows a surface of the wafer and the direction of the ion beam.

The sample board 25 can be rotated around a point on the loading surface. Moreover, the rotating surface is formed to be tilted. Namely, the incident direction of Ar beam for the wafer substrate 1 as the sample may be set freely. As shown in FIG. 13(b), the rotating angle $\theta_1$ of the wafer is set as 0°, when the ion beam projected to the X-Y plane is incident vertically. Moreover, the tilting angle $\theta_2$ of the wafer is set to 0° when the ion beam is incident parallel to the rotating axis.

Figure 14:
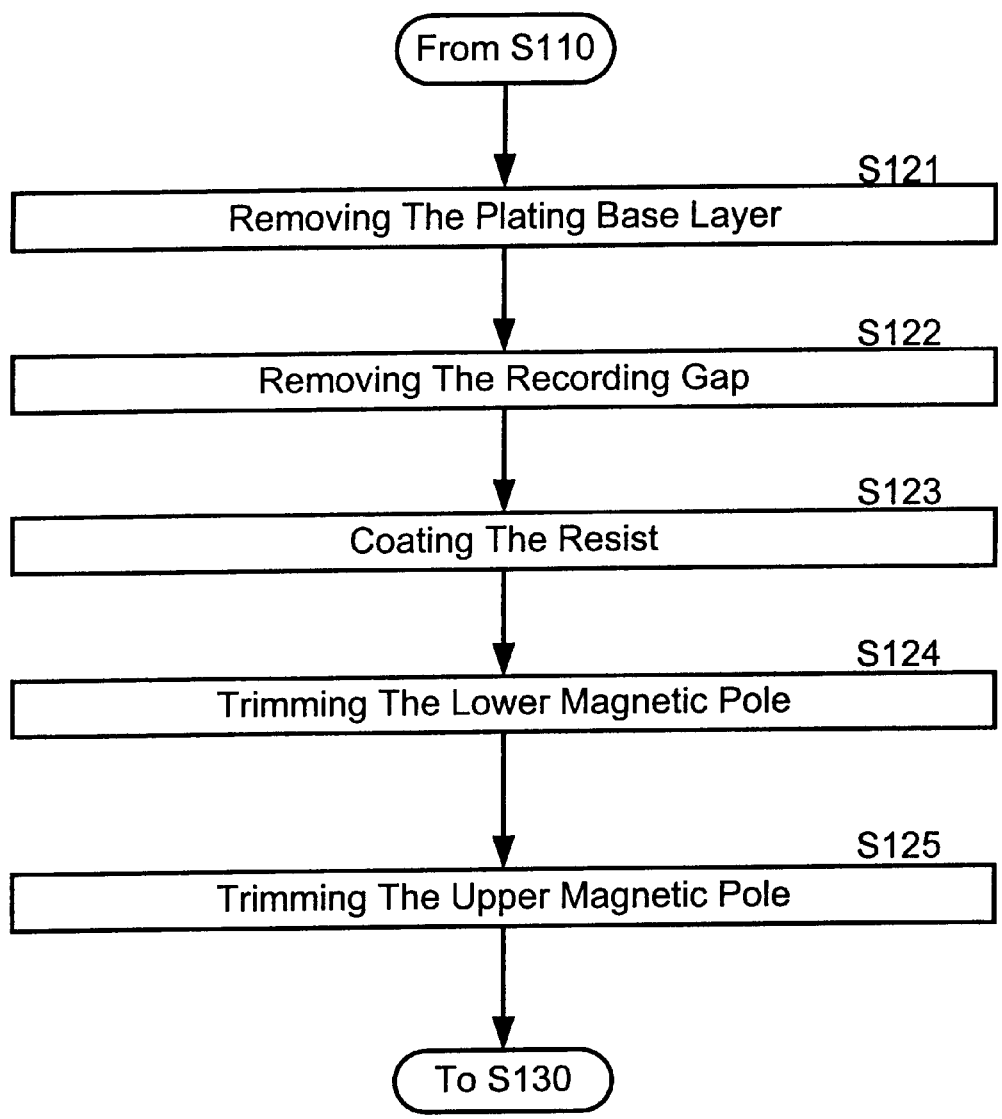
FIG. 14 is a flowchart showing the trimming method of the upper magnetic pole and lower magnetic pole.

FIG. 14 is a flowchart of the trimming method of the upper magnetic pole and the lower magnetic pole. The trimming method shown is the practical method of step S120 from FIG. 6. Reference should be made to FIG. 14 for the explanation that follows.

In step S121, the plating base layer 14 is removed. More specifically, the plating base layer 14 is removed using the ion milling method after the upper magnetic pole 16 is removed. Here, the plating base layer 14 is removed up to the area near the side wall of the upper magnetic pole 16.

In step S122, the recording gap layer 9 on the trimming object area of the lower magnetic pole 8 is removed. It is preferred that the recording gap layer 9 be removed by utilizing the reactive ion etching (RIE) method with the upper magnetic pole 16 used as the mask. If the recording gap layer 9 is removed by the ion milling method, the thickness (pole length) of the upper magnetic pole 16 is reduced greatly to lower the recording capability. The reactive ion etching enables selective etching through the effects of the reactive gas and sputtering, and such etching method is better for fine processing.

In cases where the reactive ion etching method is used, it is recommended that a process gas which can assure selectivity for resist and an interlayer insulating layer be used. Therefore, when the recording gap layer 9 is formed of $Al_2O_3$, it is preferable to use the chlorine-based process gas such as $CCl_4$, $Cl_2$, $BCl_3$ or the like as the reactive gas. When the recording gap layer 9 is formed of $SiO_2$, it is preferable to use fluorine-based process gas such as $CF_4$, $CHF_3$, $C_3F_8$, $C_2F_6$ or the like as the reactive gas.

Figure 15A:
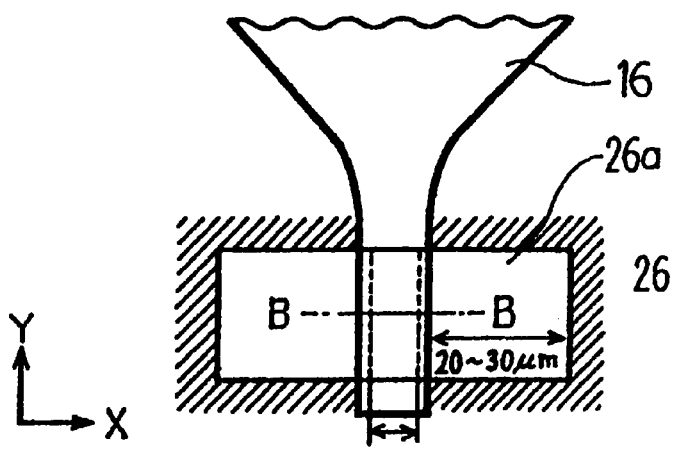
FIGS. 15(a) to 15(c) show the upper magnetic pole and the lower magnetic pole in the trimming operation in FIG. 14.
Figure 15B:
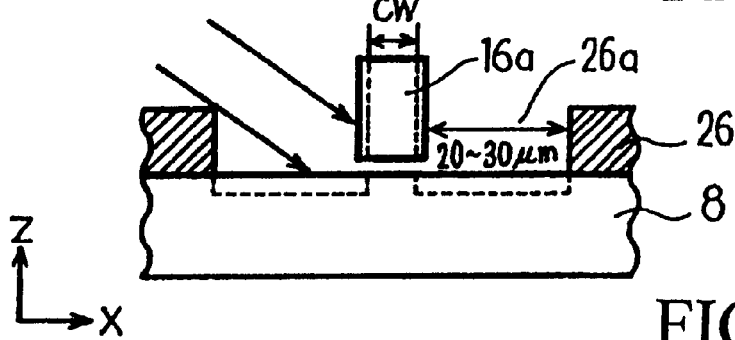
Figure 15C:
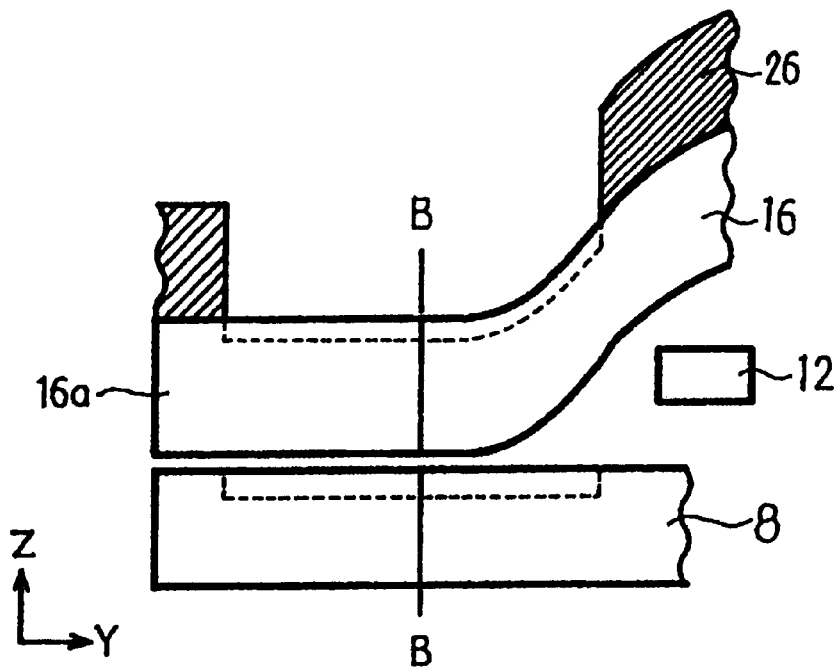

In step S123, also shown in FIG. 15, the whole resist 26 is coated except for the trimming object. In practice, damage to the part other than the trimming object in the reactive ion etching and with the use of the ion milling method explained below can be reduced by protecting the part with a film such as resist, except for the end part of the upper magnetic pole 16 and a part of the lower magnetic pole as the trimming object. In the figure, the line B—B is the cutting line for finishing.

Figure 16A:
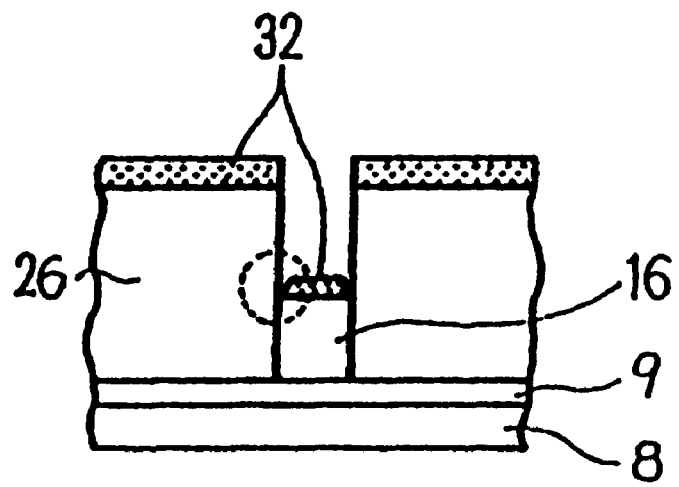
FIG. 16(a) is sectional view showing the case where a capping layer is provided.
Figure 16B:
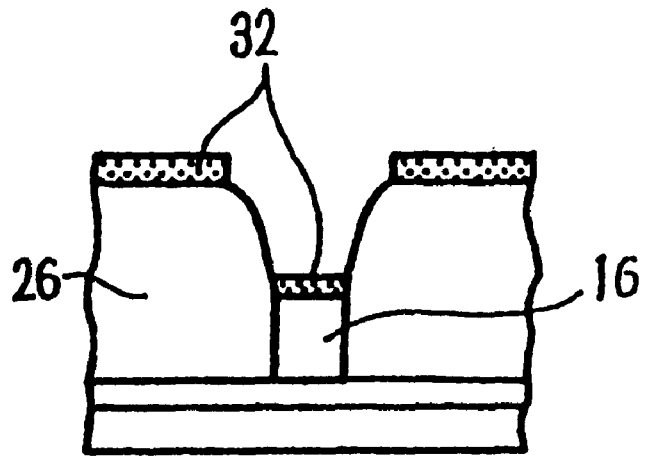
FIG. 16(b) is a sectional view showing the case where a capping layer is baked.

If desired, the reduction of the film thickness of the upper magnetic pole 16 can be avoided in the trimming process of the lower magnetic pole 8 (step S124) and the trimming process of upper magnetic pole 16 (step S125) by stacking the capping layer on the surface of the upper magnetic pole 16. In particular, as shown in FIG. 16(a), after the resist 26 is coated, a non-magnetic layer such as $Al_2O_3$ or Ti is formed as the capping layer 32 in the thickness of 0.2 to 0.4 μm on the resist 26 and upper magnetic pole 16 using the sputtering method. Because of this capping layer 32, a reduction of the thickness of the upper magnetic pole 16 in the reactive ion etching and the ion milling explained later can be avoided.

Moreover, the resist 26 is compressed and the resist aperture 26a is expanded through heat treatment at the temperature of, for example, 110° C. before the formation of the film of capping layer 32. The capping layer 32 is uniformly formed to the entire part of the surface of the upper magnetic pole 16. Particularly, the end part of the surface referred by a broken line circle in FIG. 16(a)) can be uniformly formed by forming the capping layer 32 on the upper magnetic pole 16 within the expanded aperture 26a.

The trimming process for the lower magnetic pole and the upper magnetic pole of the preferred embodiment will be explained. The trimming process for the lower and the upper magnetic poles are respectively composed of two steps and four steps in total, as illustrated in FIG. 17. Moreover, FIG. 18(a) to FIG. 18(d) show the upper magnetic pole seen from the ion beam in each step shown in FIG. 17(a) to FIG. 17(d).

Figure 17A:
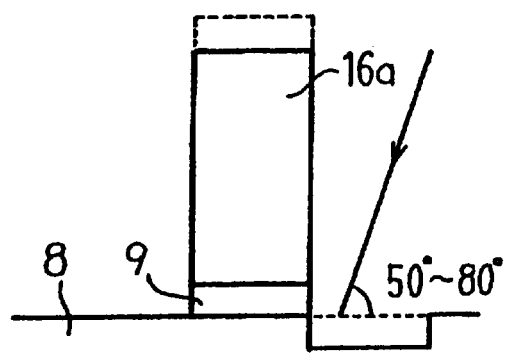
FIGS. 17(a) and 17(b) show a trimming operation which trims the lower magnetic pole.
Figure 17B:
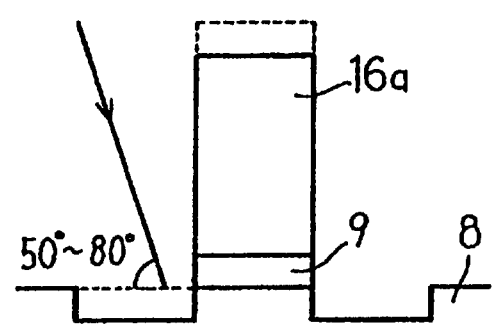

In step S124, the trimming process is performed to the upper layer of the lower magnetic pole 8. This trimming process is performed using the ion milling method under the condition of the wafer substrate is stationary. The first event in step S124 is that the trimming is conducted to the lower magnetic pole 8 in the right side seen from the ABS surface, as illustrated in FIG. 17(a).

Figure 13C:
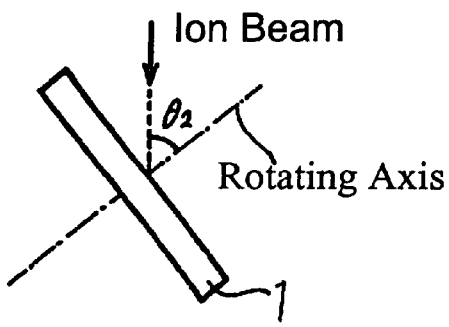
FIG. 13(c) is a side view of the wafer and the direction of the ion.
Figure 18A:
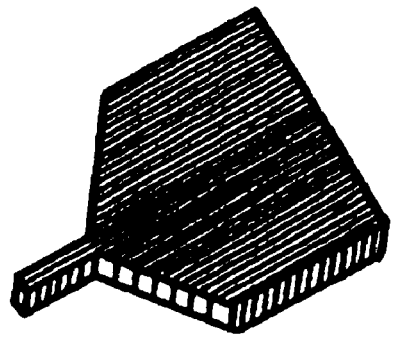
FIG. 18(a) shows the upper magnetic pole seen from the ion beam in the step shown in FIG. 17(a)

It is preferred that a tilt angle $\theta_2$ (FIG. 13(c)) of the wafer in the range of 10° to 40° be selected, and tilting of the sample board 25 be adjusted to provide for the selected angle. Namely, the ion beam can be incident in the angle of 50° to 90° for the surface of the lower magnetic pole 8. It is preferable that the rotating angle $\theta_1$ (FIG. 13(b)) of the wafer be selected in the clockwise direction from ranges of 20° to 90°, and that the rotation of the sample board 25 be controlled to provide the selected angle. As an example of the step, FIG. 18(a) shows the upper magnetic pole seen from the ion beam such that the rotating angle is set to 60° in the clockwise direction and the tilt angle is set to 30°.

Figure 18B:
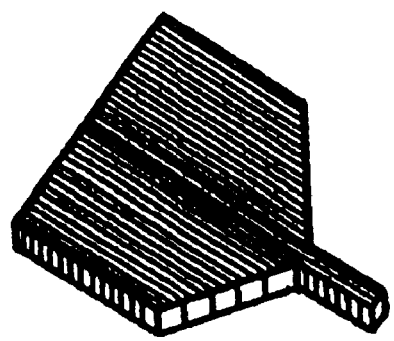
FIG. 18(b) shows the upper magnetic pole seen from the ion beam in the step shown in FIG. 17(b)

In the first routine in step S124, sufficient trimming is not performed to the left side area seen from the ABS surface, resulting in a second routine to conduct the trimming to the lower magnetic pole 8 in the left side. In the second routine, the sample board 25 is rotated so that the tilt angle is maintained. It is preferred that the rotating angle $\theta_1$ of the wafer be in the range of 20° to 90° in the counterclockwise direction. FIG. 18(b) shows the upper magnetic pole seen from the ion beam in an exemplary setting of this routine such that the rotating angle is 60° in the counterclockwise direction and tilt angle is 30°.

As previously explained in step 124, the ion beam is incident in the angle almost equal to the right angle to the surface of the lower magnetic pole 8 in order to effectively conduct the trimming of the lower magnetic pole 8 by setting the tilt angle of the wafer to 10° to 40°. Moreover, since the ion beam is a little tilted for the rotating axis, reduction of the pole length can be controlled. The cutoff condition of the ion beam can also be prevented, and the ion beam reaching the trimming object can be maximized by setting the rotating angle of the wafer to the range of ±20° to 90°.

In the step S124, explained above, the trimming has been performed to the lower magnetic pole 8 in two routines, but three or more routines may also be used by setting the incident direction of the ion beam to the head element in three or more directions. Here, it is preferable that the trimming angle and rotating angle be set in the ranges provided above.

Next in step S125, the trimming for the upper magnetic pole 16 is done, specifically the trimming for the side surface of the pole 16a. This trimming process is also conducted by using the ion milling method under the condition of the wafer substrate is stationary. With this trimming method, the core width Cw can be adjusted. In step S124, the removed particle of the lower magnetic pole 8 is adhered to the side surface. In step S125, the adhered particle of the lower magnetic pole 8 can then be removed.

Figure 17C:
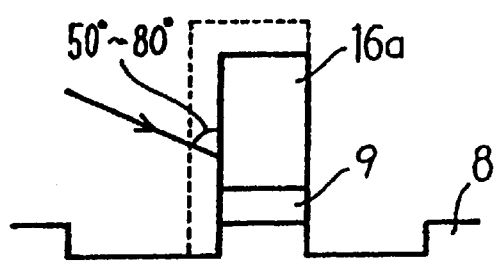
FIGS. 17(c) and 17(d) show a trimming operation which trims the side of the upper magnetic pole.
Figure 18C:
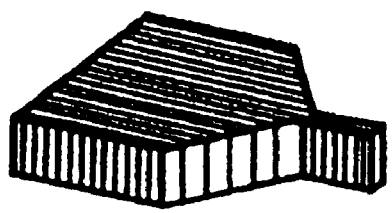
FIG. 18(c) shows the upper magnetic pole seen from the ion bean im the step shown in FIG. 17(c)

As the first routine for step S125, shown in greater detail in FIG. 17(c), the trimming is performed to the left side surface of the pole 16a seen from the ABS surface. Tilt of the sample board 25 is controlled so that the tilt angle $\theta_2$ of the wafer is ranged from 50° to 80°, and the rotating angle in the second routine of the step S124 is maintained. FIG. 18(c) shows an example of step S125, wherein the upper magnetic pole is seen from the ion beam when the rotating angle is set to 60° in the counterclockwise direction and the tilt angle is set to 60°.

Figure 17D:
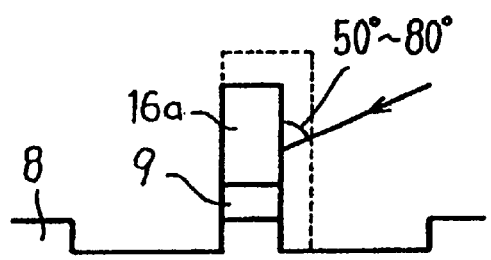
Figure 18D:
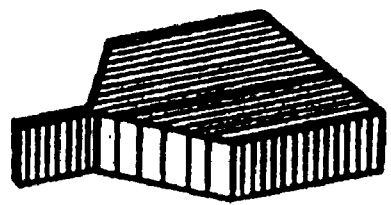
FIG. 18(d) shows the upper magnetic pole seen from the ion beam in the step shown in FIG. 17(d)

Since sufficient trimming is not performed to the right side surface of the pole 16a seen from the ABS surface in the first routine, the second routine is executed to conduct the trimming to the right side surface of the pole 16a, as shown in FIG. 17(d). In the second routine in step S125, the sample board 25 is rotated while the tilt angle is maintained. It is preferred that the rotating angle of the wafer be selected from the ranges of 20° to 90° in the clockwise direction. FIG. 18(d) is the external appearance of an element seen from the ion beam when the rotating angle is set to 60° in the counterclockwise direction as an example, and the tilt angle is set to 70°.

As explained above in step S125, since the tilt angle of the wafer is set to the range of 50° to 80°, the ion beam is incident to the side surface of pole 16a at the angle near the right angle. Thus, the trimming can be done effectively to the pole 16a.

Even in step S125, the routines of the two stages are used but it is also possible, like in step S124, to introduce the routines of three stages or more by setting the stages to the incident direction of the ion beam for the head element.

If core width direction size of the aperture 26a of resist 26 is too small, it will interfere with the Ar particle which is incident at an angle of 50° to 80°, and as a result the Ar particle does not reach the pole 16a. In order to avoid such a phenomenon, as shown in FIG. 15(a) and FIG. 15(b), the core width direction size of the aperture 26a of resist 26 must be in the range of 20 to 30 μm from the end part of the pole 16a.

Moreover, in this embodiment, the trimming process is formed by the four steps and each step may be done in the selected sequence. For example, it is possible that each routine of step S125 is executed first, and thereafter each routine of step S124 is executed.

FIG. 19 shows the effect of the present invention. Here, the present invention in which the trimming is conducted while the substrate is in stationary condition is compared with the reference HEI 10-184780 in which the trimming is conducted while the substrate is rotated, indicated by the two points of the total time of the trimming process and the reduction amount of the pole length. The target value of trimming depth of the lower magnetic pole is set to 0.3 μm, and the target value of the trimming amount of the core width is set to 0.3 μm.

As shown in FIG. 19, the trimming time of the present invention is shortened by 30 minutes per wafer than that of the reference HEI 10-184780. Moreover, a reduction of 0.5 μm in the pole length is also attained.

As explained above, the present invention has attained a reduction in the core width of the upper magnetic pole and still achieves high recording density in trimming the upper magnetic pole.

Moreover, since the trimming is conducted while the substrate is stationary, the ion beam can be irradiated selectively only to the trimming object, resulting in a shorter core width adjusting time. As a result, productivity is improved and cost reduction can also be attained. Because of the shorter adjusting time, the reduction of pole length from the trimming can be controlled, causing the magnetic head to be resistive to the magnetic field intensity.

While the principles of the invention have been described above in connection with the specific apparatus and application, it should be understand that this description is made only by way of an example and not as a limitation on the scope of the invention.

What is claimed is:

1. A magnetic head manufacturing method comprising the steps of:

forming a recording lower magnetic pole and a recording upper magnetic pole on a substrate; and trimming, by the ion milling method, a portion of said recording upper magnetic pole and said recording lower magnetic pole under the condition that said substrate is stationary.

2. The method according to claim 1 wherein said trimming step is performed at an area near a floating surface of said substrate.

3. The method according to claim 2 wherein said substrate is supported to rotate and to tilt for said trimming step in a plurality of combinations of a tilting angle and rotating angle.

4. The method according to claim 3 wherein said trimming step is performed in two kinds of tilting angles.

5. The method according to claim 4 wherein one of said tilting angles is ranged from 10° to 40° to a rotating axis, and another tilting angle is ranged from 50° to 80°.

6. The method according to claim 5 wherein said trimming step is performed with said one tilting angle prior to the other tilting angle.

7. The method according to claim 3 wherein said trimming step is performed by changing said rotating angle in two steps.

8. The method according to claim 7 wherein said trimming step further comprises the step of irradiating the ion beam at an angle with respect to substrate from normal to said floating surface.

9. The method according to claim 8 wherein the angle of irradiating is ranged from 20° to 90° with respect to said substrate.

10. The method according to claim 1 wherein said upper magnetic pole and said lower magnetic pole are formed adjacent to a recording gap layer.

11. The method according to claim 10 wherein said upper magnetic pole and said lower magnetic pole have a core width substantially the same as the core width of said recording gap layer.

* * * * *